United States Patent [19]

Inoue et al.

[11] 4,432,322
[45] Feb. 21, 1984

[54] METHOD AND SYSTEM FOR CONTROLLING IGNITION TIMING IN A MULTICYLINDER INTERNAL COMBUSTION ENGINE

[75] Inventors: Shingo Inoue, Anjo; Toshiharu Iwata, Aichi; Yasuhito Takasu, Toyohashi, all of Japan

[73] Assignee: Nippondenso Co., Ltd., Kariya, Japan

[21] Appl. No.: 403,816

[22] Filed: Jul. 30, 1982

[30] Foreign Application Priority Data

Aug. 1, 1981 [JP] Japan .............................. 56-120026
Sep. 9, 1981 [JP] Japan .............................. 56-142004
Sep. 11, 1981 [JP] Japan .............................. 56-144435

[51] Int. Cl.³ .......................... F02P 5/04; F02D 5/00; F02D 1/04
[52] U.S. Cl. ................................ 123/416; 123/417; 123/486
[58] Field of Search ................... 123/416, 417, 486

[56] References Cited

U.S. PATENT DOCUMENTS

| | | | |
|---|---|---|---|
| 4,166,437 | 9/1979 | Bianchi et al. | 123/416 |
| 4,207,847 | 6/1980 | Hattori et al. | 123/416 |
| 4,243,007 | 1/1981 | Ehrbardt et al. | 123/416 |
| 4,258,683 | 3/1981 | Hattori et al. | 123/416 |
| 4,359,987 | 11/1982 | Wesemeyer et al. | 123/416 |
| 4,368,705 | 1/1983 | Stevenson et al. | 123/416 |
| 4,377,996 | 3/1983 | Yamaguchi | 123/416 |

Primary Examiner—Raymond A. Nelli
Attorney, Agent, or Firm—Cushman, Darby & Cushman

[57] ABSTRACT

A method in a multicylinder engine, for obtaining the single combination of ignition timings for the individual cylinders producing the maximum engine speed. A group of combinations of ignition timings is selected, then the engine is successively operated by each combination. The combination producing the lowest engine speed is determined and replaced by a new combination of ignition timings capable of increasing the engine speed. The new combination is calculated by use of a predetermined formula. This procedure is repeated to obtain the single combination of ignition timings producing the maximum engine speed.

28 Claims, 21 Drawing Figures

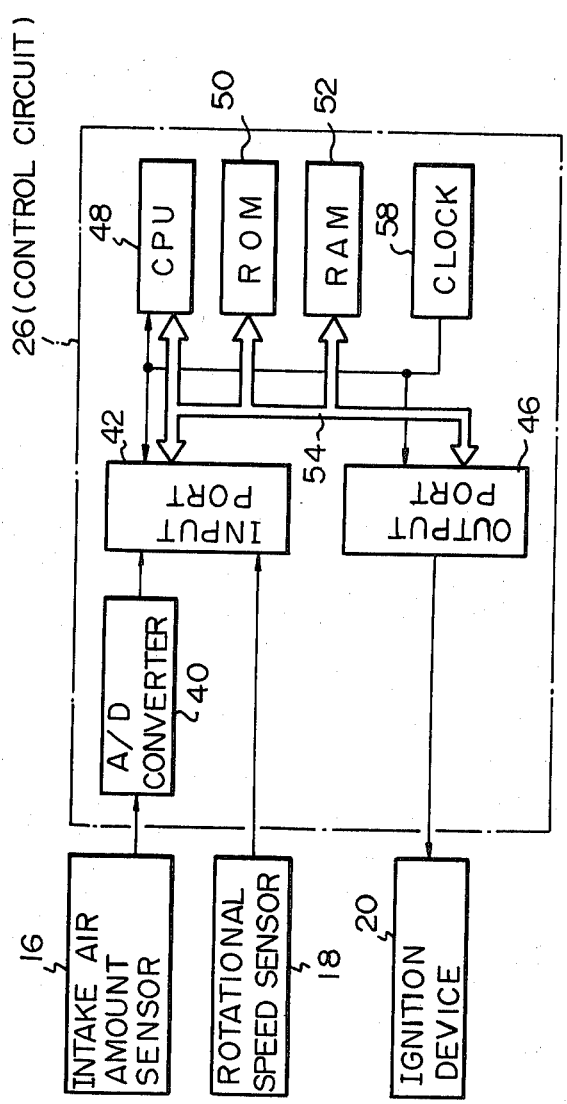

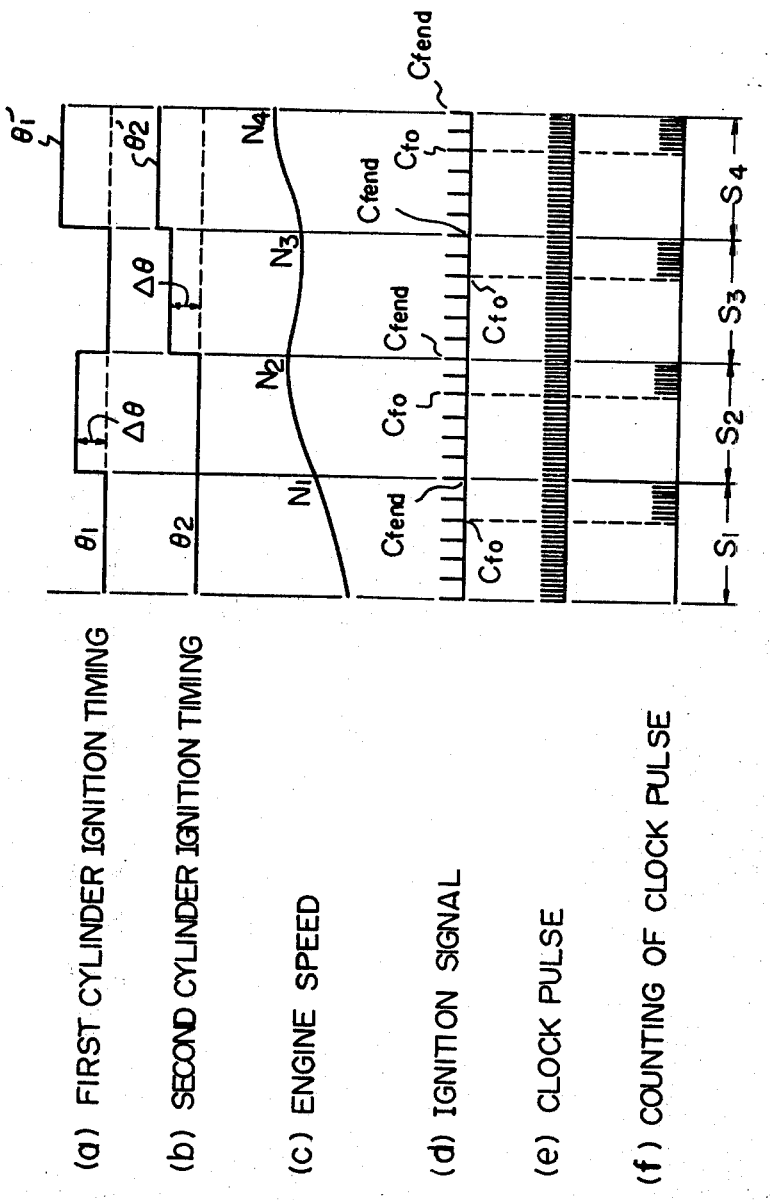

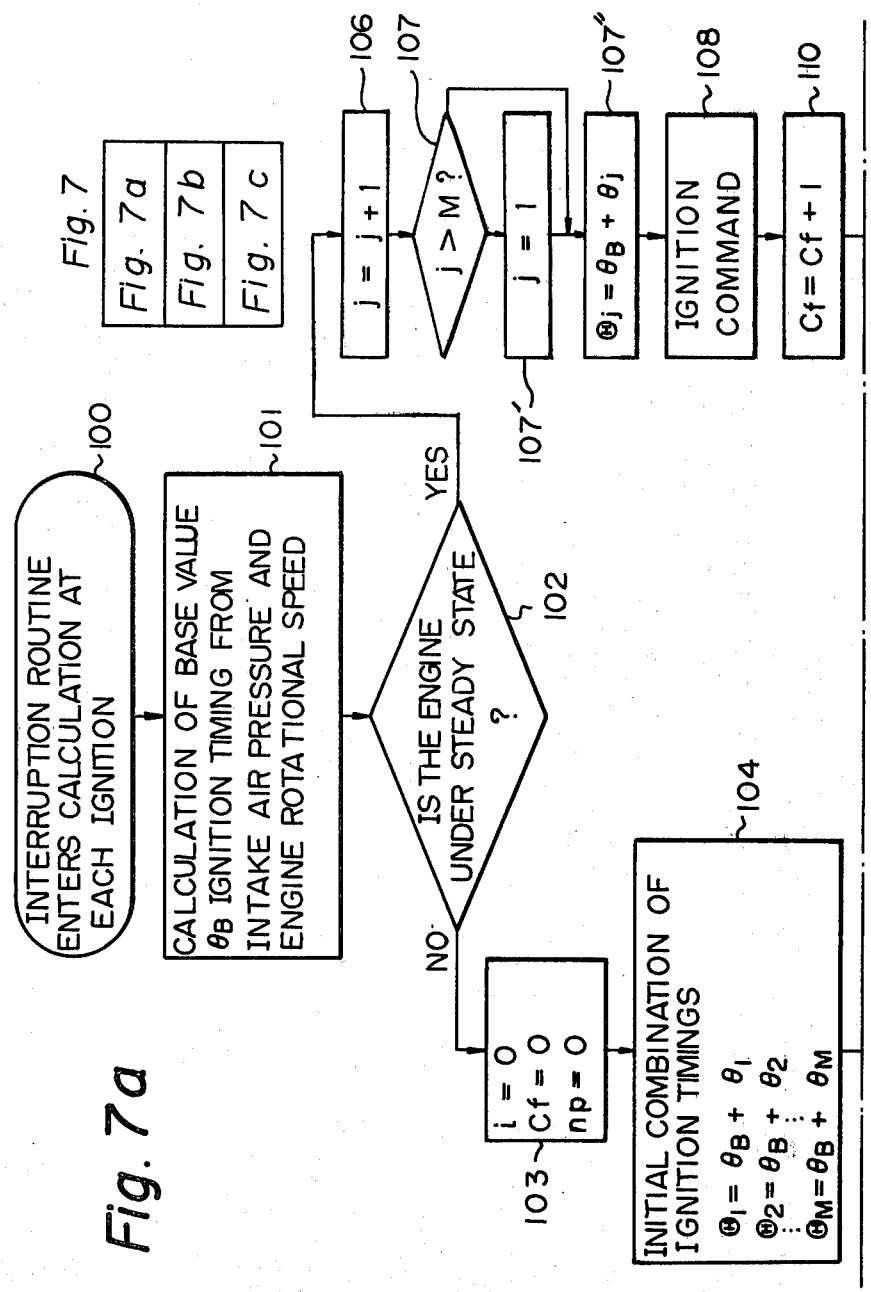

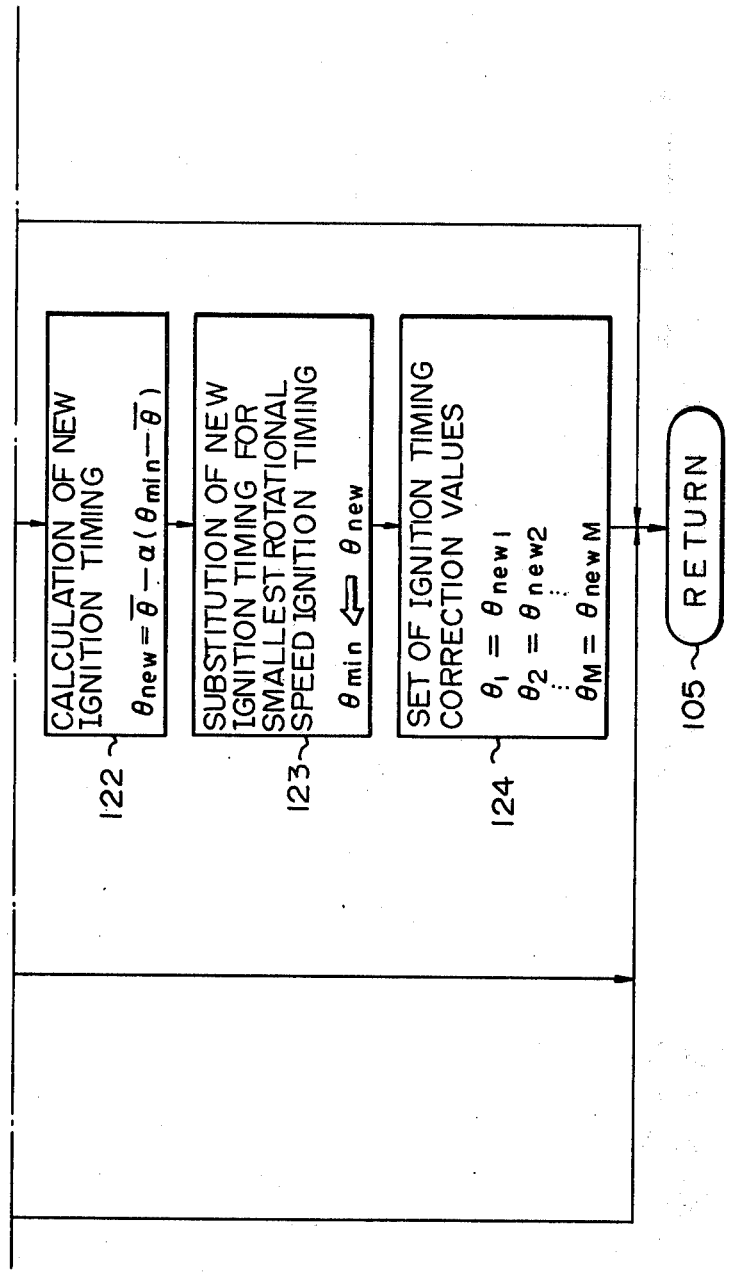

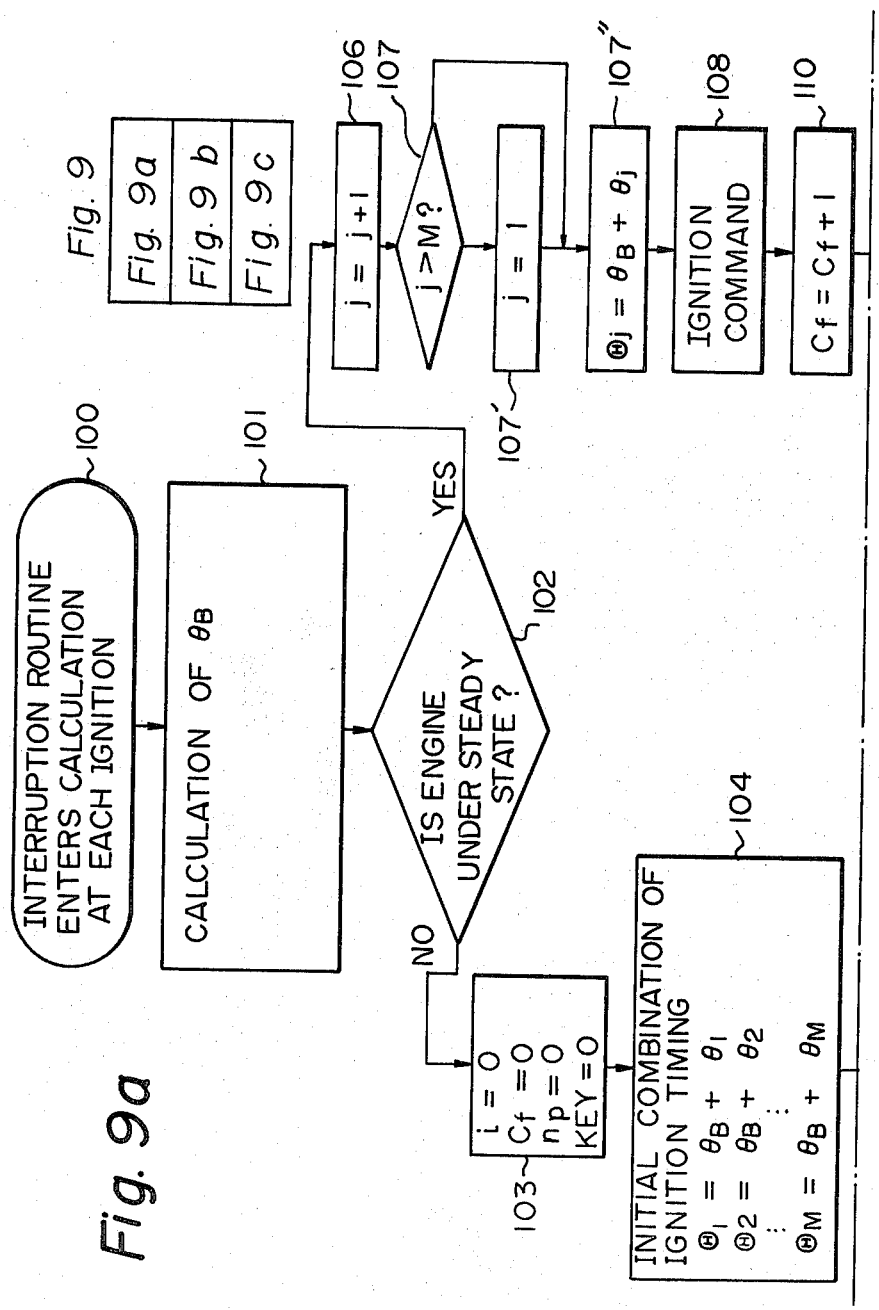

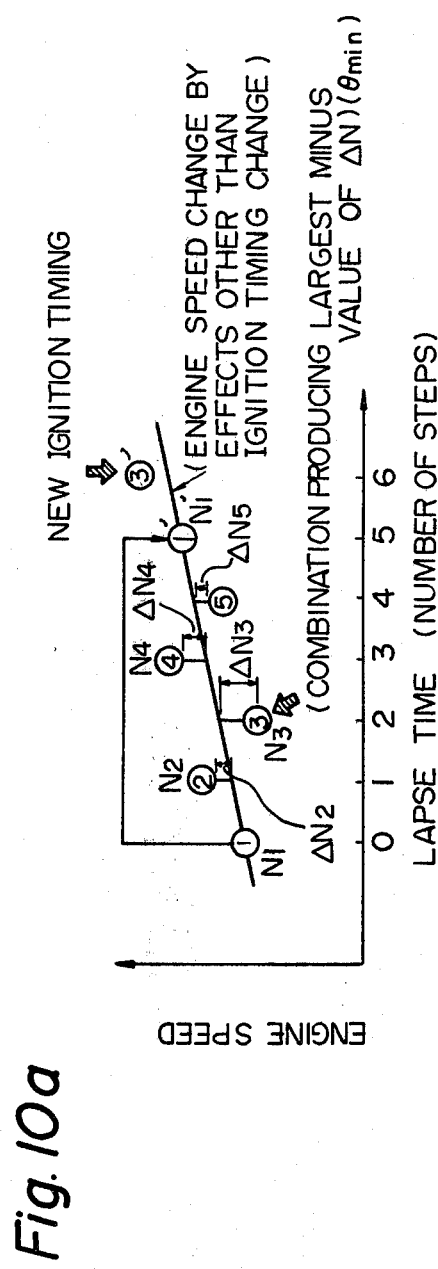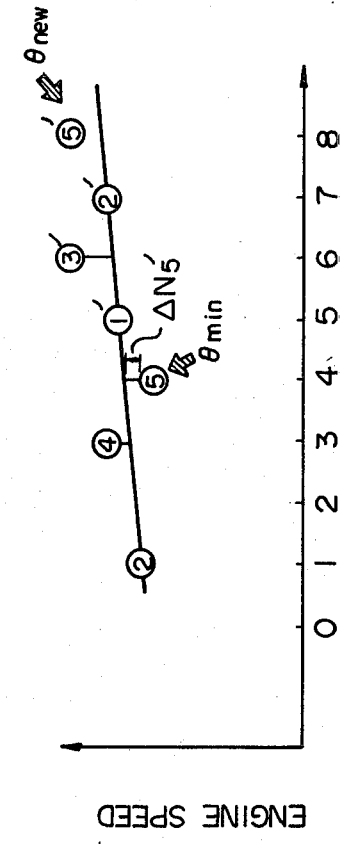
Fig. 10a
Fig. 10b

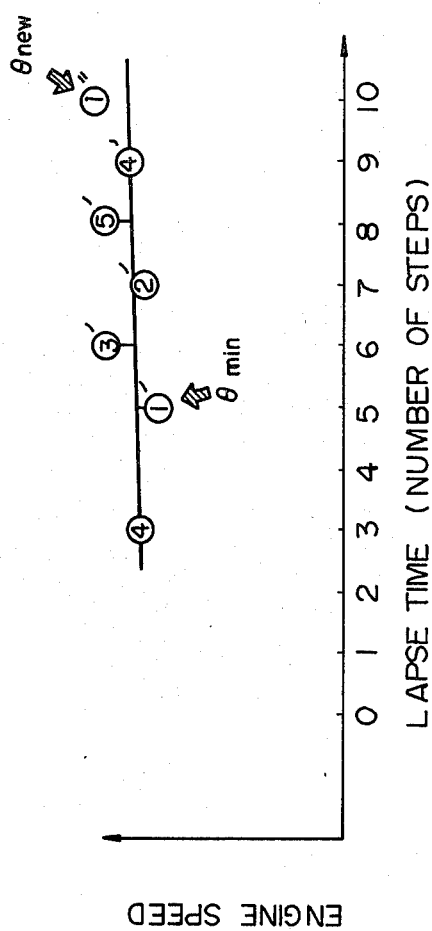
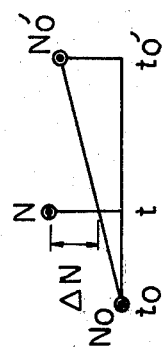
Fig. 10c
Fig. 11

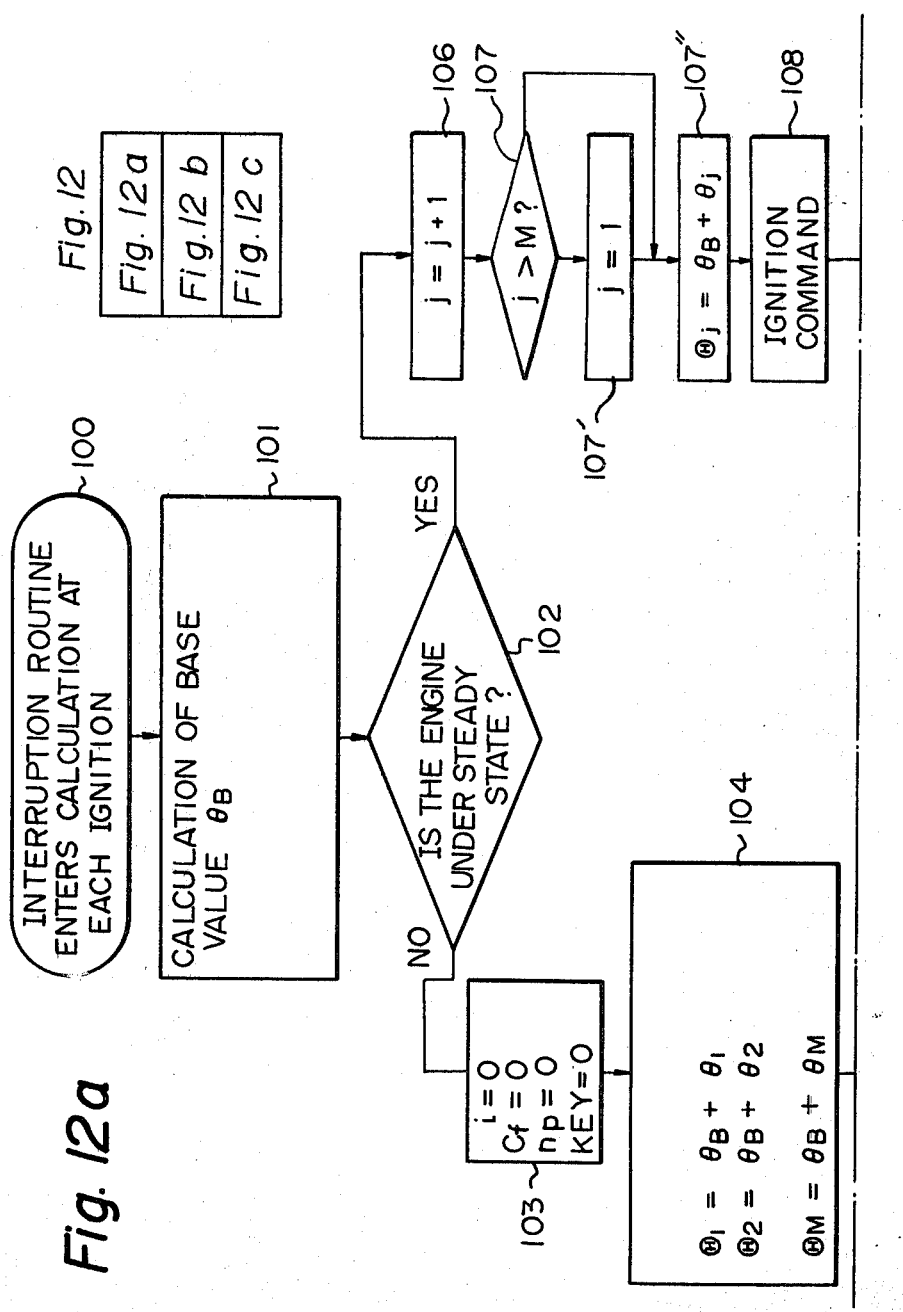

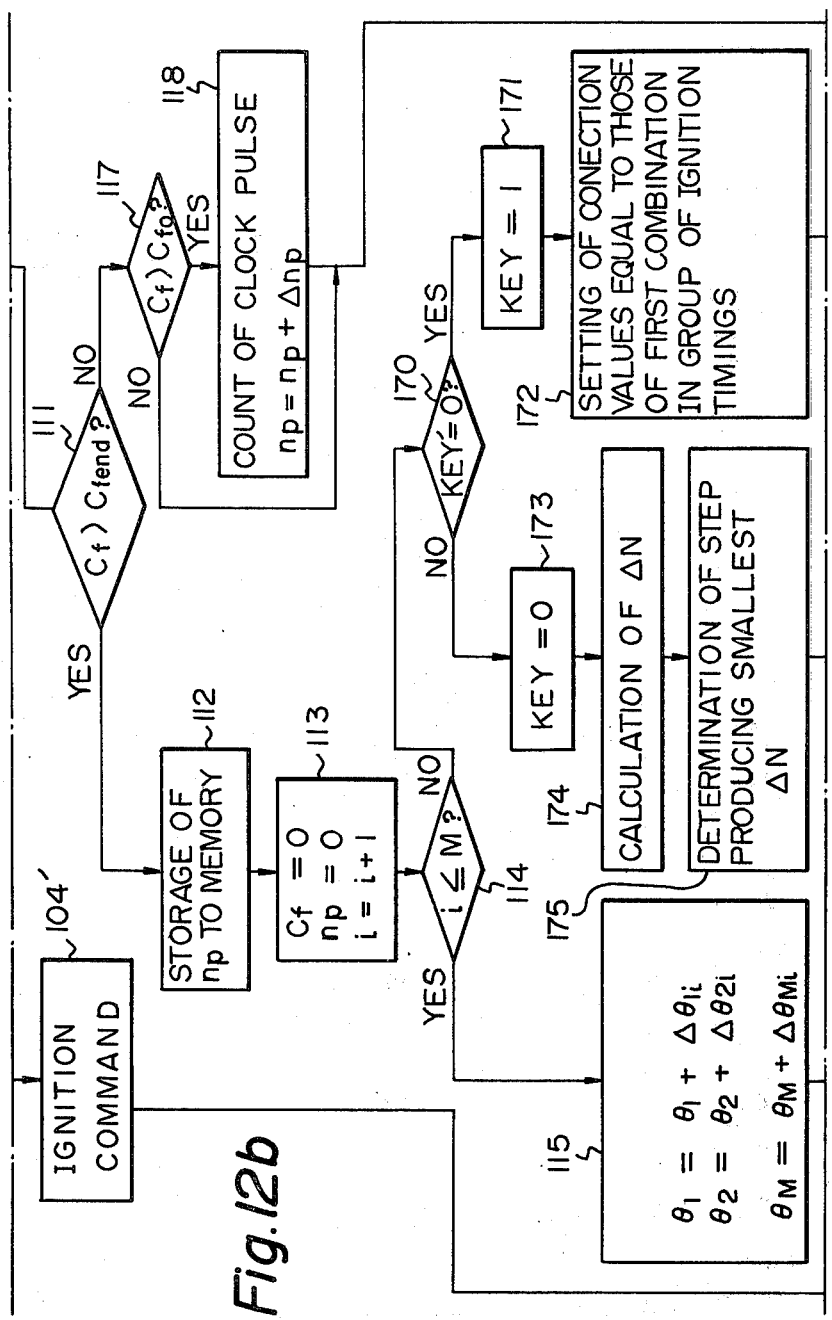

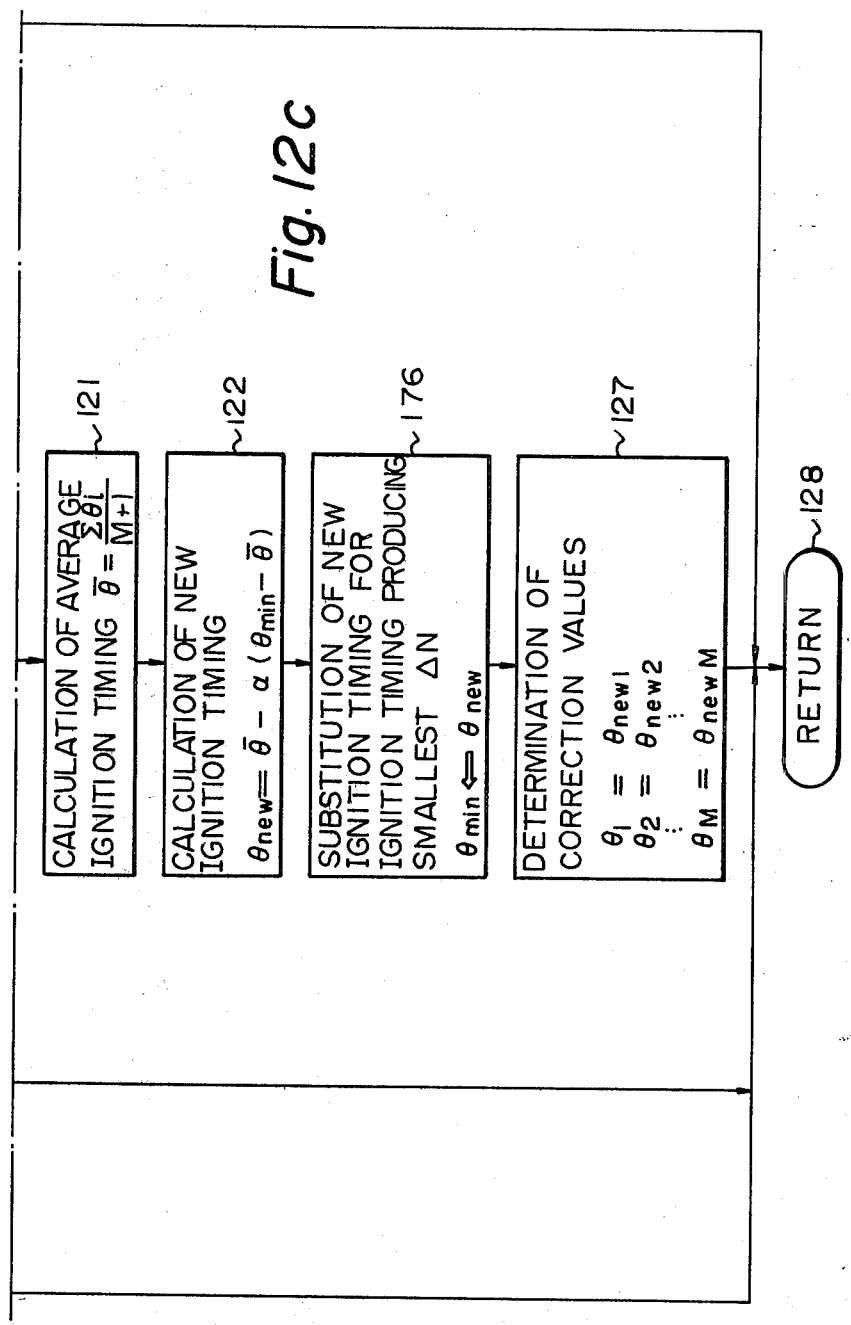

METHOD AND SYSTEM FOR CONTROLLING IGNITION TIMING IN A MULTICYLINDER INTERNAL COMBUSTION ENGINE

The present invention relates to a method and system for optimum control of ignition timing in a multicylinder internal combustion engine so as to increase fuel consumption efficiency.

Ignition timing of an internal combustion engine is generally an average value, determined according to engine running conditions such as an engine speed and intake pressure (or intake air flow), allowing maximum output and minimum fuel consumption. Multicylinder engines usually have the same average ignition timing applied to each cylinder. The ignition timing allowing maximum output differs, however, for each cylinder due to individual cylinder differences. Therefore, the above-mentioned average ignition timing is not always optimum, for any one cylinder. Application of the same average value to all the cylinders can therefore cause decreased output.

In consideration of this drawback of the prior art, an object of the present invention is to ensure maximum output efficiency by application of the optimum ignition timing to each engine cylinder.

The present invention will now be described with reference to the accompanying drawings, in which.

Figure 4:
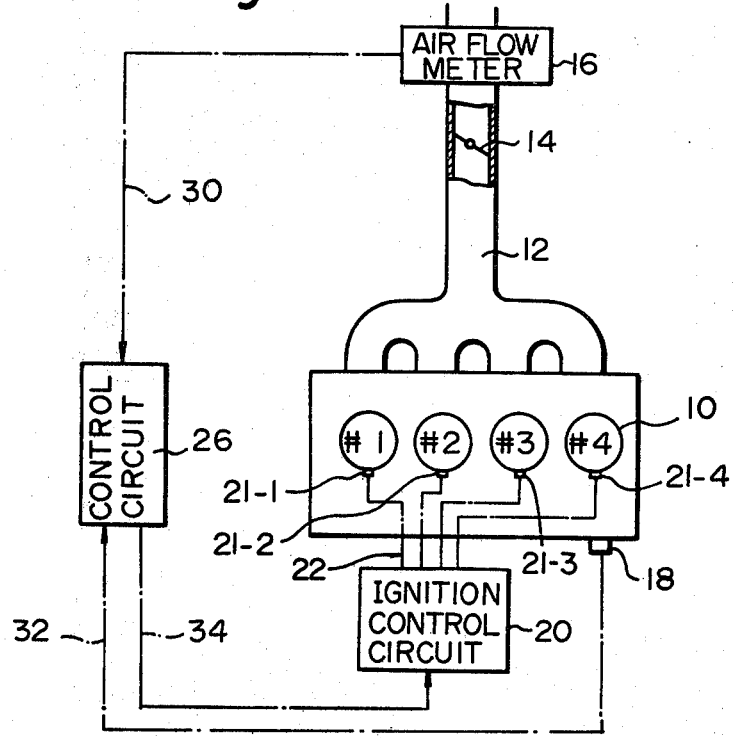
Figure 7B:
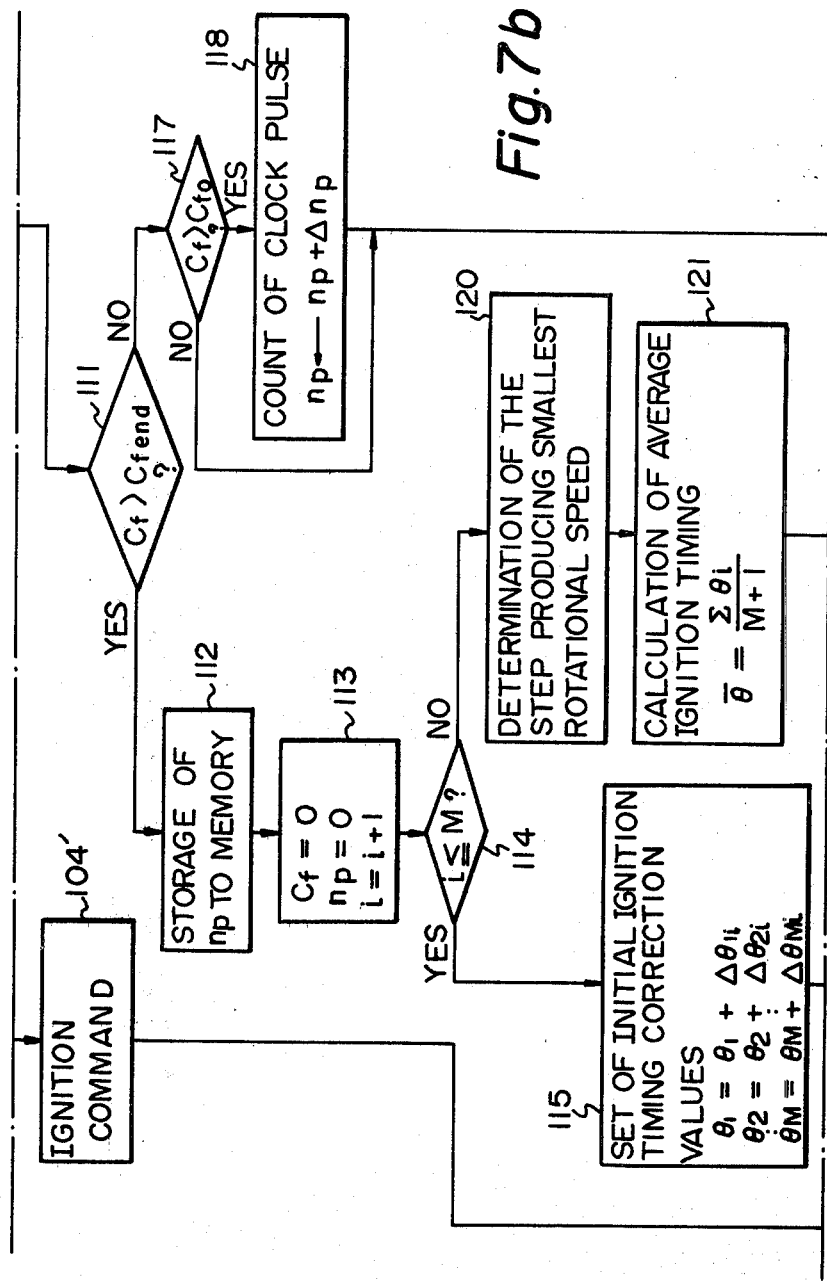
Figure 8A:
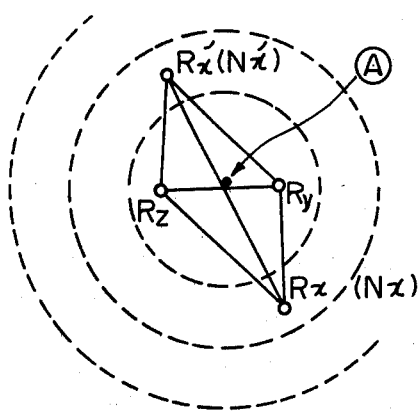
Figure 8B:
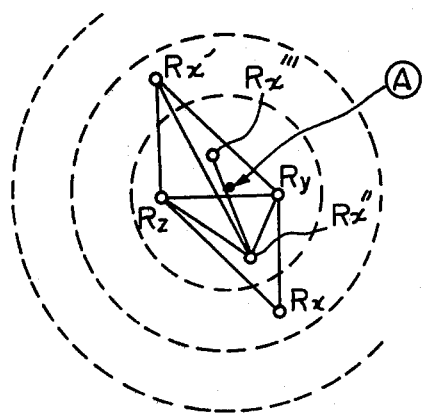
Figure 9B:
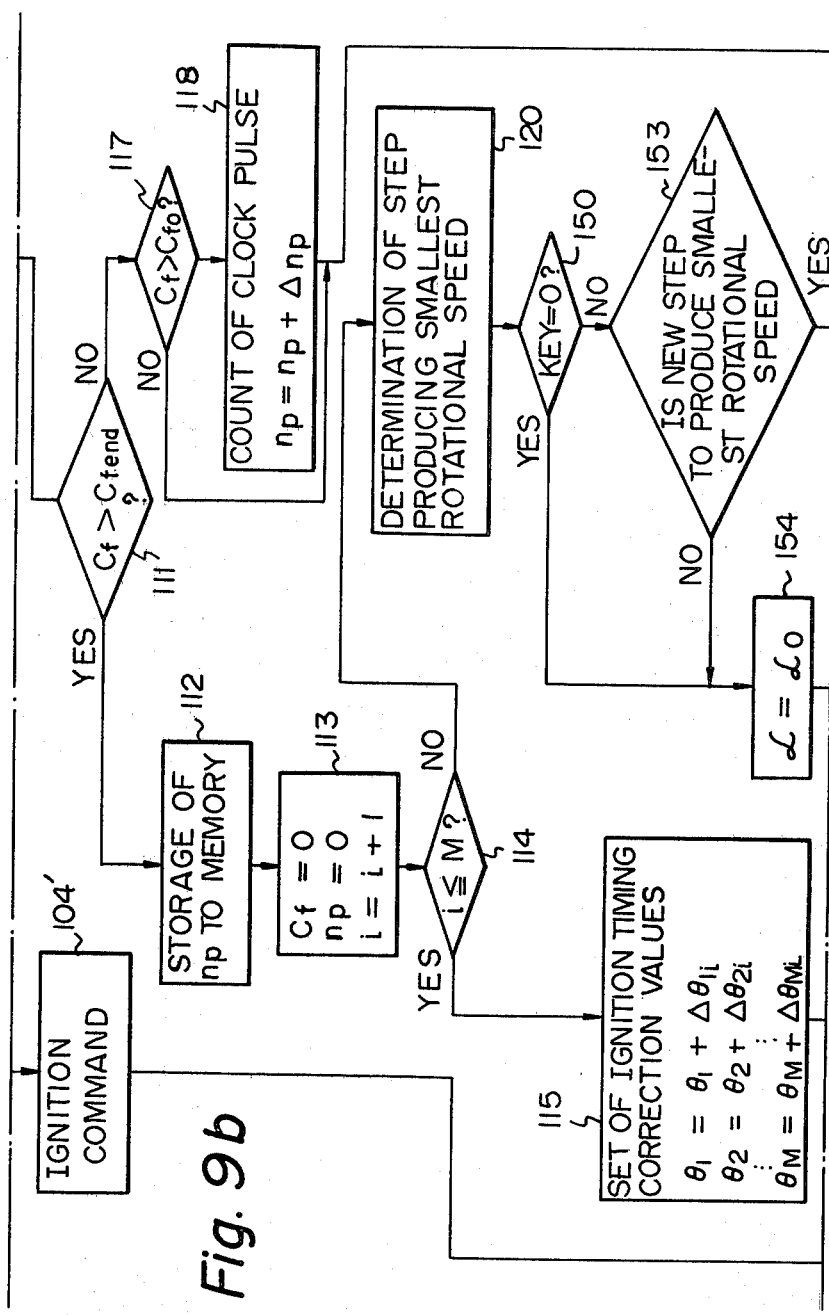
Figure 9C:
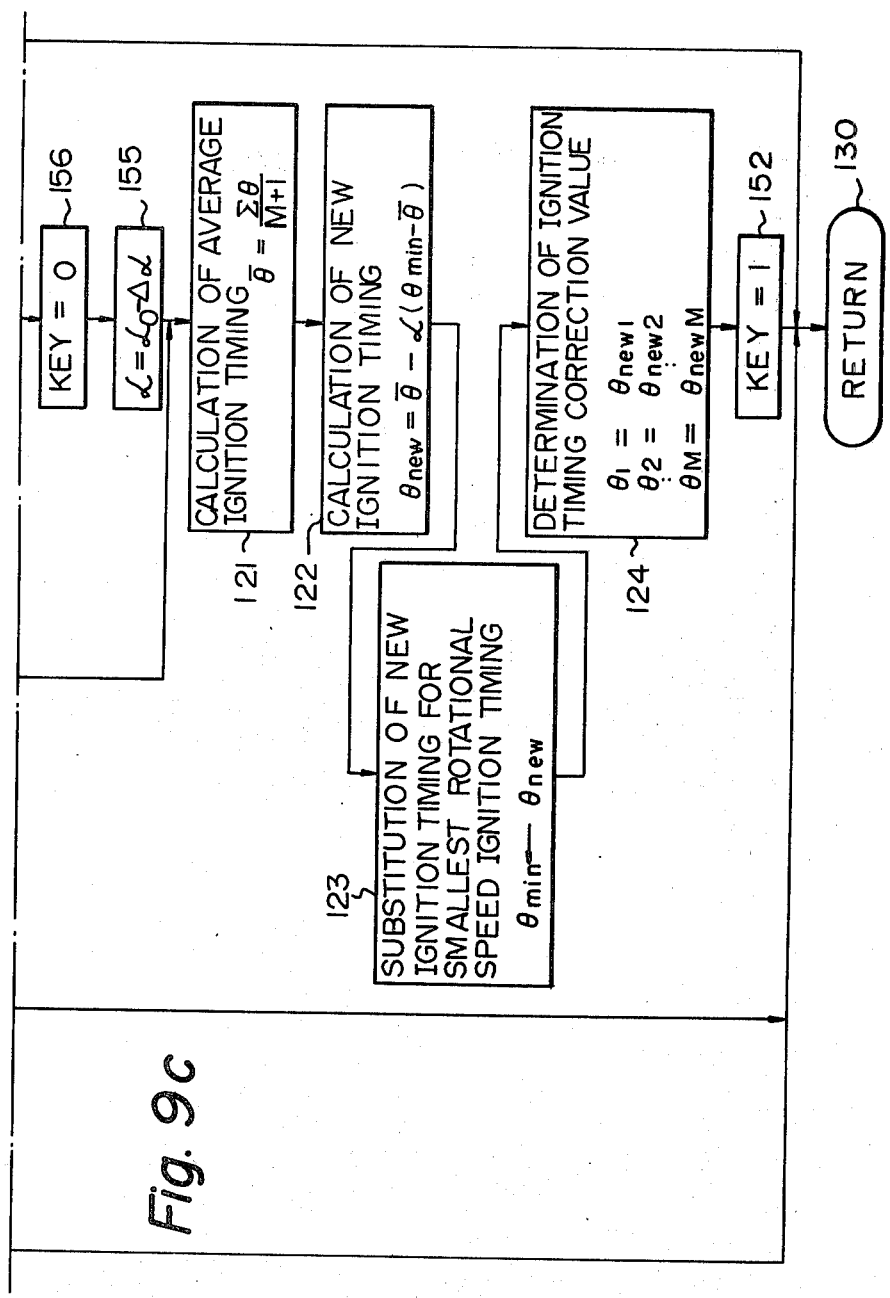

FIG. 4 schematically shows an internal combustion engine of the present invention;

FIG. 5 shows a block diagram of the control circuit in FIG. 4;

FIG. 6 shows a time chart illustrating the principle of the present invention;

FIGS. 7a, 7b and 7c show a flow chart for calculating ignition timing according to the present invention;

FIG. 8a shows an undesired hunting effect in a first embodiment of the present invention;

FIG. 8b shows an improved method of the present invention capable of preventing hunting;

FIGS. 9a, 9b and 9c show a flow chart for a second embodiment of the present invention;

FIGS. 10a, 10b and 10c show a diagram indicating changes in the groups of combinations of ignition timings in a third embodiment, applied to a four-cylinder engine;

FIG. 11 shows a method for determining the change of rotational speed caused only by ignition timing at time t; and FIGS. 12a, 12b and 12c show a flow chart for the third embodiment of the present invention.

Figure 1:
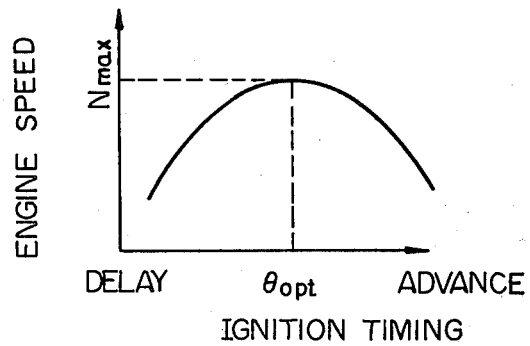
FIG. 1 shows the relationship between ignition timing and engine speed.

The present invention will now be explained in more detail in reference to the drawings. As FIG. 1 shows, there is a single ignition timing maximizing the engine speed. This optional ignition timing is given as $\theta_{opt}$ and the maximum speed as $N_{max}$. Optimum ignition timing $\theta_{opt}$ is normally different for each cylinder.

For the sake of simplicity, assume the engine is a two-cylinder type, the simplist type of multicylinder engine. In the contour map in FIG. 2, each contour line $r, r_2, r_3 \ldots$ corresponds to a fixed engine speed. As the contour map shows, there is a single combination of ignition timings $\theta_{1opt}$ and $\theta_{2opt}$ where peak A of engine speed is attained. Operation of the engine under said combination of optimum ignition timings $\theta_{1opt}$ and $\theta_{2opt}$ produces maximum engine speed.

According to the present invention, the combination of ignition timings producing the maximum engine speed is obtained in accordance with the principle described below.

Figure 2:
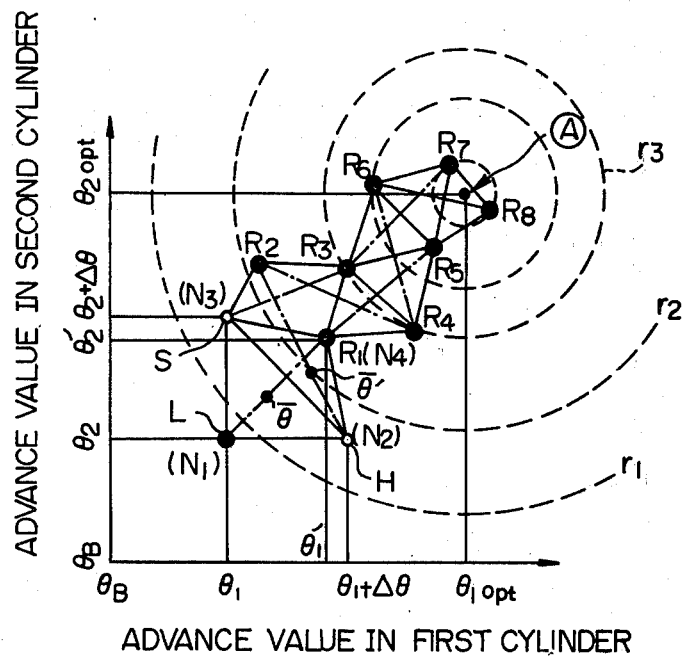
FIG. 2 shows a contour map of changes in engine speed with respect to combinations of ignition timings in a two-cylinder engine.

Referring to FIG. 2, first, an ignition timing of the first cylinder is designated as $\theta_1$ and an ignition timing of the second cylinder is designated as $\theta_2$. This combination of ignition timings, point L, is considered to give an engine speed $N_1$ when an engine is operated thereunder.

By way of reference, it should be noted that $\theta_1$ and $\theta_2$ are considered correction values, for the ignition timing, to be added to base ignition timing $\theta_B$ determined in accordance with such engine running conditions as amount of intake air (or intake air pressure) and engine speed. In other words, the origin in FIG. 2, in terms of ignition timing, is not zero, but $\theta_B$. The actual ignition timing value, therefore, is $\theta_1$ or $\theta_2$ plus $\theta_B$.

In any case, the engine is then operated under the combination of ignition timings of point H, which is slightly different from point L, for example, having an ignition timing of the first cylinder slightly larger by $\Delta\theta_1$ but with the same ignition timing of the second cylinder $(\theta_1 + \Delta\theta_1, \theta_2)$. The engine speed at this time is designated as $N_2$. The engine is then further operated under the combination of ignition timings of point S, for example, with an ignition timing of the second cylinder slightly larger by $\Delta\theta_2$ but with the same ignition timing of the first cylinder $(\theta_1, \theta_2 + \Delta\theta_2)$. Thus, the combinations of ignition timings of the two-cylinder engine are as shown in the following table.

| Combinations of ignition timings (by rotational speed) | Ignition timing | |
|---|---|---|
| | First cylinder | Second cylinder |
| $N_1$ | $\theta_1$ | $\theta_2$ |
| $N_2$ | $\theta_1 + \Delta\theta$ | $\theta_2$ |
| $N_3$ | $\theta_1$ | $\theta_2 + \Delta\theta$ |

Next, the average values $\bar{\theta}$ of each cylinder in these three combinations of ignition timing (the number of combinations being greater than the number of cylinders by 1) are calculated, the average value $\bar{\theta}$ for the first cylinder being $\theta_1 + \Delta\theta/3$ and for the second cylinder being $\theta_2 + \Delta\theta/3$. Then, the combination of ignition timings giving the lowest engine speed is determined. In the case of FIG. 2, this would be the combination of ignition timings $\theta_1$ and $\theta_2$ of point L, giving engine speed $N_1$.

Next, a new point $R_1$ is set on the line running through average value $\bar{\theta}$ and combination of ignition timings point L, where the lowest engine speed is obtained, away from the point of average value $\bar{\theta}$ in the direction opposite to point L, i.e., in the direction increasing the engine speed. The combination of ignition timings $(\theta_1', \theta_2')$ at this point $R_1$ is then calculated. The engine is operated under this combination of ignition timings and engine speed $N_4$ is obtained.

Engine speed $N_4$ is substituted for the lowest engine speed $N_1$. The three engine speeds $N_2$, $N_3$, and $N_4$ are compared, and point H of the next lowest engine speed, in the case of FIG. 2, $N_2$, is determined. Then, the average value $\bar{\theta}'$ of the three combinations of ignition timings is calculated.

Next, another new point $R_2$ is set on the line running through average value $\bar{\theta}'$ and point H of the next lowest engine speed away from the point of average value $\bar{\theta}'$ in the direction opposite to point H, i.e., in the direction increasing the engine speed.

The process is repeated to set prints $R_1 \rightarrow R_2 \rightarrow R_3 \rightarrow R_4 \rightarrow R_5 \rightarrow R_6 \rightarrow R_7 \rightarrow R_8$ and correct the combinations of ignition values in the direction increasing the engine speed, thereby enabling the engine speed peak A to be approached.

Figure 3:
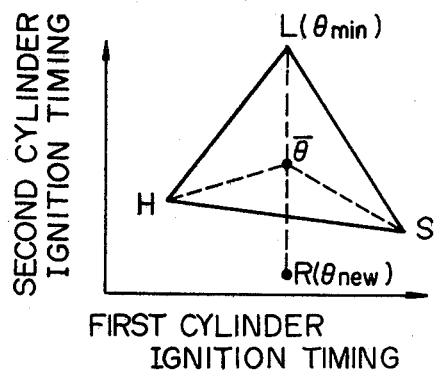
FIG. 3 shows a diagram for determining new ignition timings, to increase the engine speed from combinations of ignition timings larger than the number of cylinders by one.

FIG. 3 shows the method for setting new points R with respect to the three basic points H, S, and L. Average value $\bar{\theta}$ is obtained by the following vector equation:

$$\bar{\theta} = (H + S + L)/3 \qquad (1)$$

New points R ($\theta_{new}$) to be substituted for point L ($\theta_{min}$) is obtained by the following equation:

$$\theta_{new} = \theta - \alpha(\theta_{min} - \theta) \qquad (2)$$

where, $\alpha$: constant

The above-mentioned explanation was directed to a two-cylinder internal combustion engine for simplicity. The present invention can, however, be applied to engines having large numbers of cylinders for controlling ignition timings of each cylinder and maximizing engine rotational speed.

An apparatus embodying the above-mentioned principle of the present invention will now be described. In FIG. 4, reference numeral 10 denotes a body of an internal combustion engine provided with four cylinders #1, #2, #3, and #4. Intake air is introduced to each cylinder from the intake manifold 12. The throttle valve 14 controls the amount of intake air. An air flow meter 16 is arranged upstream of a throttle valve 14 for measuring the amount of intake air. The amount of intake air can alternatively be measured by the pressure in the intake pipe. Reference numeral 18 denotes a engine speed sensor for producing an electric signal in response to the engine speed. As the engine speed sensor 18, a conventional crank angle sensor may be used for producing pulse signals at every predetermined engine crank angle.

Reference numeral 20 denotes an ignition device comprising an electronic ignitor, a distributor, and an ignition coil (not shown). The ignition device 20 is connected to spark plug electrodes 21-1, 21-2, 21-3, and 21-4 via electric lines 22.

The ignition control circuit 26 operates to produce operational signals directed to the ignition device 20. The ignition control circuit 26 includes a computer programmed to effect the routine described later. The intake air flow sensor 16 and rotational speed sensor 18 are connected to the ignition control circuit 26 via line 30 and 32, respectively. The ignition control circuit 26 operates to calculate the ignition timing based on the intake air amount as well as the engine speed.

In FIG. 5, an input port 42 is adapted for receiving signals from the intake air amount sensor 16 and rotational speed sensor 18. Analog to digital (A/D) converter 40 operates to change the analog signal from the intake air sensor 16 to a digital signal. An output port 46 operates as a signal gate to the ignition device 20. The input port 42 and output port 46 are connected via a bus 54 to central processing unit (CPU) 48, read only memory (ROM) 50 and random access memory (RAM) 50 which are elements of a microcomputer system. Signals are transmitted between these parts synchronously with clock pulses from a clock pulse generator 58.

The ignition control circuit 26 is programmed to produce the optimal ignition timing for each cylinder according to the principle of the present invention. The time chart effected by this program as applied to a two-cylinder engine, is schematically illustrated in FIG. 6.

In first step $S_1$ of the calculation, the ignition timings of the cylinders are designated $\theta_1$ and $\theta_2$, respectively as shown by (a) and (b) in FIG. 6. Operating the engine under these conditions causes a change in the engine speed, as shown by (c), and produces ignition signals, as shown by (d). The clock pulses between predetermined ignition, signals $C_{fo}$ to $C_{fond}$ near the end of first step $S_1$ are taken in and counted, as shown in (e) and (f). The number of clock pulses located between ignition signals $C_{fo}$ and $C_{fond}$ is considered the engine rotational speed $N_1$ obtained at first step $S_1$.

In second step $S_2$, the ignition timing of the first cylinder is increased to $\theta_1 + \Delta\theta$ while the ignition timing of the second cylinder is maintained at $\theta_2$. The engine is operated for the predetermined number of ignition signals and engine speed $N_2$ is measured as the number of clock pulses between ignition signals $C_{fo}$ and $C_{fend}$.

In third step $S_3$, the ignition timing of the first cylinder is decreased to $\theta_1$ while the ignition timing of the second cylinder is increased to $\theta_2 + \Delta\theta$. Engine speed $N_3$ is measured in a similar fashion.

In the fourth step $S_4$, the ignition timings of the first and second cylinders are then set to $\theta_1'$ and $\theta_2'$, respectively. As explained earlier with reference to FIGS. 2 and 3, the new combination of ignition timings $\theta_1'$ and $\theta_2'$ is obtained by first determining the average value $\bar{\theta}$ of the combinations of ignition timings, determining the point of the combination of ignition timings $\theta_{min}$ giving the lowest engine speed, then calculating by formula (2) a new point R of a combination of ignition timings $\theta_1'$ and $\theta_2'$ located away from average value $\bar{\theta}$ in the direction opposite to the point of the lowest engine speed. Getting back to fourth step $S_4$, engine speed $N_4$ is measured as the number of clock pulses during operation of the engine by the predetermined number of ignition signals.

Fourth step $S_4$ is continuously repeated with the new combinations of ignition timings being continuously substituted for the combinations of ignition timings of each previous step giving the lowest engine speed.

The program for obtaining the time chart shown in FIG. 6 will be described by the flow chart, shown in FIG. 7. When the engine starts, the program enters into the interruption routine at a point 100 for calculating the ignition timing. At a point 101, base ignition timing $\theta_B$ is calculated from the amount of intake air (or intake air pressure) detected by intake air amount sensor 16 (or intake air pressure sensor) and the engine speed detected by the speed sensor 18. More specifically, ROM 50 is provided with a basic ignition timing map with respect to combinations intake air amounts and engine speeds. By using this memorized map, basic ignition timing $\theta_B$ corresponding to the combination of the detected intake air amount and engine speed is calculated.

At a point 102, judgement is made whether or not the engine is operating under a steady state based on changes in the engine speed and intake air amount. If the engine is not operating under a steady state (No), the program proceeds to a point 103. At the point 103, a step counter, ignition counter, and clock pulse counter are cleared to zero, i.e., i=0, Cf=0, and Np=0, respectively. At the next point 104, the initial ignition timings of the first, second, third, ... Mth cylinders are determined by the following equations:

$$\begin{aligned} \textcircled{H}_1 &= \theta_B + \theta_1 \\ \textcircled{H}_2 &= \theta_B + \theta_2 \\ &\cdots \\ \textcircled{H}_M &= \theta_B + \theta_M \end{aligned} \quad (3)$$

$\theta_1, \theta_2 \ldots \theta_M$ mean, as already described with reference to FIG. 2, the correction values of ignition timing. Thus, the actual ignition timings for the cylinders are obtained by adding $\theta_1, \theta_2 \ldots \theta_M$ to the basic $\theta_B$ ignition timing obtained at point 101. Then, the program proceeds to point 104' where CPU 48 produces a signal via the output port 46 to operate the ignition device 20, causing ignition at ignition timings $\textcircled{H}_1, \textcircled{H}_2 \ldots \textcircled{H}_M$ for each engine cylinder. The program then returns to the main routine at point 105.

At the point 102, if it is judged that the engine is under a steady state (Yes), the engine speed at point L is measured. This corresponds to step $S_1$ of FIG. 6. At a point 106, a counter J which is clear at every number of cylinders is incremented by 1. At a point 107, it is judged whether or not J is larger than the number M of cylinder. If J is larger than M, the program proceeds to a point 107' to reset the counter to 1. If J is not larger than M, the program proceeds to a point 107". At the point 107" the ignition timings for the cylinders $\textcircled{H}$ J are calculated. These are equivalent to basic ignition timing $\theta_B$, obtained at the point 100, plus correction values $\theta_1, \theta_2 \ldots \theta_M$ memorized in RAM 52. The program then proceeds to a point 108 to produce signals to operate ignition device 20. At the point 110, ignition counter is, incremented by 1 at every ignition operation.

At a point 111, judgement is made whether or not number of ignitions $C_f$ is larger than $C_{fend}$ in FIG. 6. In the initial stages, $C_f$ is of course, not larger than $C_{fend}$ (No), so the program proceeds to a point 117, where judgement is made whether or not the number of ignitions $C_f$ is larger than $C_{fo}$ in FIG. 6. In the initial stages, the result of the judgement at the point 117 is No, which means that it is not yet the time to measure the engine speed. In this case, the program proceeds to the point 105 to return to the main routine.

If it is judged that number of ignitions $C_f$ is larger than $C_{fo}$ (Yes), the program proceeds to a point 118. At the point 118, the clock counter is incremented by $\Delta np$, corresponding to the number of clock pulses between two adjacent ignition signals.

If it is judged that the number of ignitions $C_f$ is larger than $C_{fend}$ at the point 111 (Yes), the program proceeds to the point 112, where the number of clock pulses counted by the clock pulse counter is stored in RAM 52. This np value corresponds to engine speed $N_1$ in step $S_1$.

At the point 113, the ignition counter and clock pulse counter are reset to 0, while the step counter is incremented by 1. At the point 114, judgement is made whether or not $i \leq M$. Since i is equal to 1, the result of the judgement at point 114 is Yes.

The program then proceeds to a point 115 to determine the combination of ignition timings at point H (in FIG. 1). This corresponds to step $S_2$ of FIG. 6. At the point 115, the correction values of the cylinders are calculated by the following equations:

$$\begin{aligned} \theta_1 &= \theta_1 + \Delta\theta_{11} \\ \theta_2 &= \theta_2 + \Delta\theta_{21} \\ &\cdots \\ \theta_M &= \theta_M + \Delta\theta_{Mi} \end{aligned} \quad (4)$$

The program then returns to the main routine at point 105. Incidentally FIGS. 2 and 6, the ignition timing in the first cylinder is increased by $\Delta\theta$, while the ignition timing in the second is maintained without change (this means $\Delta\theta_{21}=0$). However, a value of $\Delta\theta_{21}$ other than 0 can be employed.

At the subsequent ignition process, the interruption routine again enters into calculation at a point 100 to detect the number of clock pulses between ignition signal $C_{fo}$ and $C_{fend}$ as engine speed $N_2$ in second step $S_2$. The result is stored in the RAM 52 at the point 112. At the point 113, the ignition counter and clock pulse counter are reset and the step counter is incremented by 1.

When the engine has only two cylinders, the judgement is still "Yes" at the point 114. The program proceeds to the point 115 to determine the correction values of ignition timing at the point S in FIG. 7 corresponding to step $S_3$ in FIG. 6. At the point 115, the correction values are calculated by the following equations:

$$\begin{aligned} \theta_1 &= \theta_1 + \Delta\theta_{12} \\ \theta_2 &= \theta_2 + \Delta\theta_{22} \\ &\cdots \\ \theta_M &= \theta_M + \Delta\theta_{M2} \end{aligned} \quad (5)$$

The number of clock pulses np is calculated as the engine speed $N_3$ of step $S_3$ in similar way by effecting the routine below the point 106, and is stored in the RAM 52 at the point 112.

When the engine has two cylinders, the first judgement at the point 114 is "No". The program proceeds to a point 120 to determine the point L in FIG. 2 for attaining the lowest engine speed.

At a point 121, average ignition timing value $\theta$ is calculated by equation (1):

$$\bar{\theta}=(H+S+L)/3$$

This equation is of a vector notation. Thus, calculation is effected per every cylinder component.

At the next point 122, new ignition timing $\theta_{new}$ is calculated using equation (2):

$$\theta_{new}=\bar{\theta}-\alpha(\theta_{min}=\bar{\theta})$$

This equation is also expressed by a vector notation. Thus, the calculation is effected per every cylinder component.

At the next point 123, new ignition timing $\theta_{new}$ obtained at point 123 is substituted for ignition timing $\theta_{min}$ providing the lowest rotational speed. Then, at a point 124, new ignition timings $\theta_{new1}, \theta_{new2} \ldots, \theta_{newM}$ are set as the correction values $\theta_1, \theta_2 \ldots, \theta_M$.

After the new combination of ignition timings is determined, the calculation of step $S_4$ in FIG. 6 at the next interruption is effected to enter the routine of 106, 107, 107', 170", 108, 110, 111, 117, and 118 in FIG. 7 so as to measure engine speed $N_4$. The program then proceeds to the points 120, 121, 122, 123, and 124, to calculate the average ignition timing value $\bar{\theta}'$ in points S, H, and $R_1$ in FIG. 2; to determine new point $R_2$ where the engine speed is increased, to calculate the cylinder components of the ignition timing at point $R_2$, and to calculate the correction values of ignition timing. This procedure is repeated to obtain peak A of the engine speed.

In the above-mentioned first embodiment procedure, the engine speed obtained in the new combination of ignition timings by formula (2) may have a value equal to the lowest engine speed obtained in the previous combination. In FIG. 8, showing an enlarged view of the position near engine speed peak A in the contour map three points for obtaining the new point are indicated by $R_x$, $R_y$, and $R_z$. In this case, new point $R_x'$ obtained by calculating formula (2) has engine speed $N_x'$ equal to the lowest value ($N_x$) obtained at point $R_x$. Thus, in the next step of calculation, point $R_x$ is again obtained if the same formula of calculation $\theta_{new} = \bar{\theta} - \alpha(\theta_{min} - \bar{\theta})$ is maintained. Thus, the new combination of ignition timings only moves between point $R_x$ and $R_x'$ (so-called hunting effect), and the optimum combination of ignition timings providing peak A of the calculation cannot be obtained.

In a second modified embodiment of the present invention, when new point $R_x'$ has rotational speed $N_x'$ equal to lowest value $N_x$ of the previous step, the formula of calculation is modified so that the engine speed at the new point set in the subsequent step does not become that lowest value. In the embodiment, the formula determining the new point is changed to $$\theta_{new} = \bar{\theta} - \alpha'(\theta_{min} - \bar{\theta}) \quad (6)$$

Since $\alpha'$ is reduced from $\alpha$ in equation (2), new points $R_x''$ and $R_x'''$ set by formula (6) do not correspond to point $R_x$ producing the lowest engine speed, as illustrated in FIG. 8b. Thus, the ignition timing can approach the optimum ignition timing producing of the engine speed peak A.

A program attaining such a principle is shown in the flow chart of FIG. 9. Points of the program in FIG. 9 having the same numbers as FIG. 7 correspond to those in FIG. 7. The program of FIG. 9 is therefore mainly explained with regard to points which differ from FIG. 7.

After the combination of ignition timings producing the lowest engine speed is determined at the point 120, the program proceeds to a point 150 to determine whether or not a flag KEY is 0. (The flag KEY is a flag which is set at a point 152, when the new combination of ignition timings is determined at point 124.) Thus a "No" judgement at the point 150 (KEY=1) means that the new combination of ignition timings is set at the proceeding step. In this case, the program proceeds to a point 153 where judgement is made whether or not the new combination of ignition timings will produce the lowest engine speed. If the judgement at the point 153 is "No", the program proceeds to the point 154, where $\alpha$ is set to $\alpha_0$, which is equal to the preceding value. Thus, the formula for calculating the new combination of ignition timings used at the next point, $\theta_{new} = \bar{\theta} - \alpha(\theta_{min} - \bar{\theta})$, is maintained without change.

If the judgement at the point 153 is "Yes", the program proceeds to the point 155, where $\alpha$ is reduced to $\alpha - \alpha_0$. This means that the formula for calculating the new combination of ignition timings at the subsequent point is modified. Therefore, if the preceding point is $R_x'$ in FIG. 8b, a new point $R_x''$ is determined in place of $R_x$ so that the new combination ignition timings can approach the optimum combination of ignition timings. A point 156 indicates reset of the flag KEY.

In the first and second embodiments of FIGS. 7 and 9, engine running conditions other than ignition timing influencing engine speed are ignored. The third embodiment, which will be described hereinafter, is directed to the elimination of such other influences. In this embodiment, after the engine is successively operated by the combinations of ignition timings, of a number equal to the number of cylinders plus one, the engine is operated once more by the first combination of the ignition timings. Thus, the combinations of ignition timings in the case of two cylinders may be, for example, determined as shown by the following table.

| Combinations of ignition timings | | Ignition timing | |
| (by engine speed) | Step | First cylinder | Second cylinder |
| --- | --- | --- | --- |
| $N_1$ | $S_1$ | $\theta_1$ | $\theta_2$ |
| $N_2$ | $S_2$ | $\theta_1 + \Delta\theta$ | $\theta_2$ |
| $N_3$ | $S_3$ | $\theta_1$ | $\theta_2 + \Delta\theta$ |
| $N'_1$ | $S_4$ | $\theta_1$ | $\theta_2$ |

The average value $\bar{\theta}$ for the first and second cylinders, therefore, is $\theta_1 + \Delta\theta/4$ and $\theta_2 + \Delta\theta/4$, respectively.

As clear from the above table, the engine is once more operated at the first combination of ignition timings $\theta_1$ and $\theta_2$. Any difference between engine speed $N_1'$ obtained at this repeated first combination of ignition timings and engine speed $N_1$ obtained at the ignition timings $\theta_1$ and $\theta_2$ is regarded as in influence on the engine speed by engine running conditions other than ignition timing, such as acceleration pedal operation. If it is assumed that the engine speed linearly increases from $N_1$ to $N_1'$ between the first and the last steps of the operation, the effect of the acceleration pedal operation on the engine speed obtained at steps $S_1$ and $S_3$ (other than the first and the last steps $S_1$ and $S_4$) can be calculated by interpolation. This can be used to correct the engine speed data and precisely calculate the combination of ignition timings producing the lowest engine speed only by the effect of ignition timing.

As in the first and second embodiments, a new combination of ignition timings is substituted, in the combinations of ignition timings, for the combination of ignition timings producing the lowest engine speed. Repeated substitution in subsequent steps enables the optimum combination of ignition timings producing the largest engine speed to be approached.

In FIG. 10, (a), (b), and (c) each illustrates the change of engine speed in a four-cylinder engine in adjacent three group combinations of ignition timings. In first group (a), the engine is successively operated by combinations of ignitoin timings 1 through 5 (the number of combinations being equal to the number of engine cylinders plus 1) to obtain engine speed $N_1$ through $N_5$ at each step, and is then operated at a combination of ignition timings 1' equal to that of the first combination of ignition timings 1' equal to that of the first combination 1 to obtain engine speed $N_1'$ at the last steps. Distances $\Delta N_2$, $\Delta N_3$, and $\Delta N_4$ of the points of the engine speed at combinations 2, 3, 4, and 5 from a line connecting the points ① and ①' of the engine speed of the same combination of ignition timings are calculated. FIG. 11 shows a method for calculating the distance $\Delta N$ by interpolation. Such distance $\Delta N$ is calculated by the following equation:

$$\Delta N = N - \left\{ N'_o - \frac{t'_o - t}{t'_o - t_o} (N'_o - N_o) \right\}$$

Since the engine speed linearly increases to $N_1'$ from $N_1$, such distances $\Delta N_2$, $\Delta N_3$, $\Delta N_4$, and $\Delta N_5$ are considered influences on the engine speed by the change of ignition timing. Thus, the combination of ignition timings, for example 3, producing the smallest value of distance, $\Delta N_3$ should be considered as the combination of ignition timings producing the lowest engine speed. Thus, a point 3' of the new combination of ignition timings is calculated by the formula:

$$\theta_{new} = \bar{\theta} - \alpha(\theta_{min} - \bar{\theta})$$

and is operated at point 3' to produce the smallest value of distance, $\Delta N_3$. Thus, a new group of combinations of ignition timings comprised of points 2, 4, 5, 1', and 3' in FIG. 10b is obtained. The engine is operated at combination of ignition timings point 2', which is equal to that of first point 2. Then, in similar way as described in reference to (a), combination of ignition timings points to produce the smallest value of distance, $\Delta N_5'$ is calculated. New point 5' obtained by the formula is substituted for point 5 and is operated to obtain the engine speed at the point. A new group of combinations of ignition timings comprised of 4, 1', 3', 2', and 5' is introduced as shown in FIG. 10c. The engine is operated at combination of ignition timings point 4' which is equal to that of first point 4 in this group. Thus, a new point 1'' producing the smallest distance, which is replaced by 1', is determined. By repeating this procedure, the combination of ignition timings producing the maximum engine speed can be obtained, not influenced by factors, such as acceleration pedal operation, other than the ignition timing.

A program attaining the above-mentioned principle of the third embodiment of the present invention is shown in the flow chart of FIG. 11.

After the combinations of ignition timings of the number larger than the engine cylinders plus 1 are set, the result judgement at the point 114 is "Yes". The program proceeds to a point 170 where judgement is made whether or not flag KEY' is 0. When KEY' is 0, the program proceeds to a point 171 to set flag KEY'. Then, at the point 172, correction values of the ignition timing are determined equal to the correction values of the ignition timing of the first combination in this group of combinations of ignition timings (in the example in FIG. 10c, the combination of ignition timings at point 1). Thus the engine is once more operated at this combination of ignition timings by effecting the points 106, 107, 107', 107'', 108, 111, 117, 118 and 112 to obtain an engine speed, for example N' in FIG. 10c.

When the program again reaches the point 120, the judgement becomes "No". Thus the program proceeds to a point 173 to clear flag KEY' and then to a point 174 to calculate the distance as the change of engine speed $\Delta N$. At the next point 175, the combination of ignition timings producing the smallest distance ($\Delta N_3$ in FIG. 10a) is determined. At the point 121, average ignition timing value $\bar{\theta}$ is calculated. Then, at the point 122, new combination of, ignition timings $\theta_{new}$ is calculated, as in FIGS. 7 and 9. At a point 176, the new combination of ignition timings is substituted for the combination of ignition timings producing the smallest $\Delta N$.

In this embodiment, a new combination of ignition timings producing the lowest engine speed just influenced by ignition timing can be determined. Thus, precise control of ignition timing can be realized.

While the present invention has been described with reference to the attached drawings, many modification and changes may be made by those skilled in this art without departing from the scope of the present invenition.

We claim:

1. A method, in a multicylinder internal combustion engine, for obtaining the optimum combination of ignition timings for the individual cylinders, comprising the steps of:
   (a) detecting at least one engine running condition parameter;
   (b) selecting a group of combination of ignition timings, each combination comprising ignition timings for the individual cylinders of the engine, which timings are determined in accordance with the running condition parameter;
   (c) successively operating the engine by the combinations of ignition timings for a predetermined period;
   (d) detecting, at each period, a parameter value corresponding to the engine output characteristic;
   (e) determining, by comparing the detected parameter values obtained at the combinations in said group, the combination of ignition timings $\theta_{min}$ producing an output characteristic most distant from the optimum output characteristic;
   (f) calculating, by using a predetermined formula, a new combination of ignition timings $\theta_{new}$;
   (g) operating the engine at the new combination of ignition timings for the predetermined period;
   (h) detecting the engine output characteristic parameter value, obtained in the operation in step (g);
   (i) substituting, in said group of combinations of ignition timings in (b), the new combination of ignition timings $\theta_{new}$ for the combination of ignition timings $\theta_{min}$; and,
   (j) repeating the above-mentioned steps (e) through (i) so that the new combination of ignition timings progressively approaches the single combination of ignition timings.

2. A method according to claim 1, wherein the number of combinations of ignition timings in (b) is equal to the number of engine cylinders plus 1 and wherein the calculation of the new combination of ignition timings $\theta_{new}$ in (f) comprises: calculating, for each engine cylinder, an average ignition timing value $\theta$ in the group of the combinations of ignition timings in (b) and calculating said new combination of ignition timings $\theta_{new}$ by the predetermined formula, which corresponds to the following equation:

$$\theta_{new} = \bar{\theta} - \alpha(\theta_{min} - \bar{\theta}).$$

where: $\alpha$ is constant.

3. A method according to claim 1, further comprising judging whether or not the calculated parameter in (f)

corresponds to the parameter value obtained at the output characteristic most distant from the optimum output characteristic in (e) and wherein the calculation in (f) effected at step (j) comprises maintaining the formula when the judgement is "No", modifying the formula when the judgement is "Yes", and calculating the new combination of ignition timings $\theta_{new}$ by using the maintained or the modified formula.

4. A method according to claim 3, wherein the number of the combination of ignition timings in (a) is equal to the number of the engine cylinders plus 1; wherein calculation of the new combination of ignition timings $\theta_{new}$ comrises calculating, for each cylinder an average ignition timing value $\bar{\theta}$ in the group of combinations of ignition timings and calculating said new combination of ignition timings $\theta_{new}$ by the formula, which corresponds to $\theta_{new} = \bar{\theta} - \alpha(\theta_{min} - \bar{\theta})$; and wherein modifying the formula comprises subtracting a fixed value $\Delta\alpha$ from $\alpha$.

5. A method according to claim 1, wherein it further comprises operating the engine once more at least one combination of ignition timings selected from said group of combinations of ignition timings and detecting the output condition parameter value at said selected combination and wherein said determination in (e) comprises calculating the difference between the deleted parameter value in said repeated operation and the detected parameter value at the same combination of ignition timing in the preceding step, and correcting the data of the detected parameters by use of the difference and comparing the corrected parameters to obtain the combination of ignition timings producing the operating output characteristic most distant from the optimum output characteristic.

6. A method according to claim 5, wherein said correcting step comprises determining the straight line connecting the location producing the parameter value obtained at the combination selected in the preceding step and the location producing the parameter value obtained at the combination selected in the subsequent repeated step, calculating the distances from the line to the locations producing the parameter values at the combinations of ignition timings other than the selected combination of ignition timings, and determining the minimum value of said distances, the combination of ignition timings producing the minimum value being used as the combination of ignition timings $\theta_{min}$ in (e).

7. A method according to claim 5, wherein the combination of ignition timings selected from the group of combinations of ignition timings is the first combination.

8. A method according to claim 5, wherein the operation is repeated after opeation at the combinations in (b).

9. A method according to claim 1, wherein the selecting of said group of combinations of ignition timings comprises calculating a basic ignition timing value common to all the cylinders and determined in accordance with at least one engine running condition in (a) and selecting correction values added to the basic value, said correction values being independently determined for the each cylinder.

10. A method according to claim 1, wherein said detection in (a) comprises detecting the engine speed and the intake air pressure.

11. A method according to claim 1, wherein the detection in (d) comprises detecting the engine speed during the period.

12. A method according to claim 11, wherein the detection of the engine speed comprises:

counting the ignitions from the beginning of the period;
counting the clock pulses after a predetermined number of ignition signals are produced;
stopping the count after a predetermined number of clock pulses are produced; and
calculating from the obtained number of clock pulses the engine speed at the period.

13. A method, in a multicylinder internal combustion engine, for obtaining the single combination of ignition timings for the individual cylinders producing the optimum engine output characteristic, comprising the steps of:

(a) detecting at least one engine running condition parameter;
(b) selecting a group of combinations of ignition timings, each combination comprising ignition timings for the individual cylinders of the engine, which timings are determined in accordance with the running condition parameter;
(c) successively operating the engine by the combinations of ignition timings for a predetermined period;
(d) detecting, at each period, a parameter value corresponding to the engine output characteristic;
(e) determining, by comparing the detected parameter values obtained at the combinations in said group, the combination of ignition timings $\theta_{min}$ producing an output characteristic most distant from the optimum output characteristic;
(f) calculating, by using a predetermined formula, a new combination of ignition timings $\theta_{min}$;
(g) judging whether or not the calculated ignition timings in (f) correspond to the parameter values at the engine output characteristic most distant from the optimum output characteristic;
(h) maintaining the formula in the preceding period when the judgement at (g) is "No";
(i) modifying the formula to a new formula when the judgement at (g) is "Yes";
(j) operating the engine at the new combination of the ignition timings for the predetermined period;
(k) detecting the engine output characteristic parameter value obtained in the operation in step (j);
(l) substituting, in said group of combinations of ignition timings in (b), the new combination of ignition timings $\theta_{new}$ for the combination of ignition timings $\theta_{min}$; and
(m) repeating the above-mentioned steps of (e) through (l) so that the new combination of ignition timings progressively approaches the single combination of ignition timings.

14. A method according to claim 13, wherein the number of combinations of ignition timings in (b) is equal to the number of engine cylinders plus 1, wherein the calculation of the new combination of ignition timings in (f) comprises calculating, for each engine cylinder, an average ignition timing value $\bar{\theta}$ in the group of the combinations of ignition timings and calculating said new combination of ignition timings $\theta_{new}$ by the predetermined formula, which corresponds to the following equation.

$$\theta_{new} = \bar{\theta} - \alpha(\theta_{min} - \bar{\theta})$$

wherein: $\alpha$ is constant; and wherein the modification in (i) is effected by subtracting a fixed value $\Delta\alpha$ from $\alpha$ which was used in the preceding period.

15. A method, in a multicylinder internal combustion engine, for obtaining the single combination of ignition timings for the individual cylinders producing the optimum engine output characteristic, comprising the steps of:

(a) detecting at least one engine running condition parameter;

(b) selecting a group of combinations of ignition timings, each combination comprising ignition timings for the individual cylinders of the engine, which timings are determined in accordance with the running condition parameter;

(c) successively operating the engine by the combinations of ignition timings for a predetermined period;

(d) detecting, at each period, a parameter value corresponding to the engine output characteristics;

(e) selecting at least one combination of ignition timings from said group of combinations of ignition timings;

(f) operating the engine for the period once more at said at least one combination selected of ignition timings from said group of combinations of ignition timings;

(g) detecting at the period in (f), a parameter value corresponding to the engine output characteristic;

(h) calculating the difference between the detected parameter value in (g) and the detected parameter value at the selected combination in the period in (d);

(i) correcting the parameter values detected at (d) by use of the difference in (h);

(j) determining, by comparing the corrected parameter values, the combination of ignition timings $\theta_{min}$ producing an output characteristic most distant from the optimum output characteristic;

(k) calculating, by using a predetermined formula, a new combination of ignition timings $\theta_{new}$;

(l) operating the engine at the new combinations of ignition timings for the predetermined period;

(m) detecting the engine output condition parameter value obtained in the operation in step (g);

(n) substituting, in said group of combinations of ignition timings in (b), the new combination of ignition timings $\theta_{new}$ for the combination of ignition timings $\theta_{min}$; and (o) repeating the above-mentioned steps (e) through (n) so that the new combination of ignition timings progressively approaches the single combination of ignition timings.

16. A method according to claim 15, wherein said correction in (i) comprises determining the straight line connecting the location producing the parameter value obtained in (f) and the location producing the parameter value at the selected combination in the previous step, calculating the distances from the line to the locations producing the parameter values at the combinations of ignition timings other than the selected combination of the ignition timings in the preceding step in (d), and determining the minimum value of said distances, the ignition timings producing the minimum value being used as the combination of ignition timings in (j).

17. A method according to claim 16, wherein the combination of ignition timings selected from the group of combinations of ignition timings is the first combination.

18. A method according to claim 16, wherein the operation is repeated after operation at the combinations in (b).

19. A system for controlling ignition timing of a multicylinder internal combustion engine provided with a spark device for each cylinder, adapted for obtaining the single combination of ignition timings for the individual cylinders producing the optimum engine output characteristic, comprising:

(a) driving means connected to the spark devices of the engine cylinders for independently controlling the operation when the cylinders are ignited;

(b) first sensing means for providing electric signals indicating at least one engine running condition;

(c) second sensing means for providing electric signals indicating the engine output characteristic;

(d) operating means responsive to the signals from the sensing means to provide signals directed to the driving means for controlling the ignition timings of the cylinders, said operating means comprising:

(i) means for receiving signals from the first sensing means, indicating at least one engine running condition parameter;

(ii) means for selecting a group of combinations of ignition timings, each combination comprising ignition timings for the individual cylinders of the engine, which timings are determined in accordance with the running condition parameter;

(iii) means for producing signals directed to said drive means for successively operating the engine by each combination of ignition timings for a predetermined period;

(iv) means for receiving signals from the second sensing means for detecting, at each period, a parameter value corresponding to the engine output characteristic;

(v) means for determining, by comparing the detected parameter value, the combination of ignition timings $\theta_{min}$ producing an output characteristic most distant from the optimum output characteristic;

(vi) means for calculating, by using a predetermined formula, a new combination of ignition timings $\theta_{new}$;

(vii) means for producing signals directed to said drive means for operating the engine at the new combination of ignition timings for the predetermined period;

(viii) means for receiving signals from the second sensing means for detecting the engine output condition parameter value obtained in the operation in step (vii);

(ix) means for substituting, in said group of combinations of ignition timings in (ii), the new combination of ignition timings $\theta_{new}$ for the combination of ignition timings $\theta_{min}$; and (x) means for repeating the steps effected in (v) through (ix) so that the new combination of ignition valves progressively approaches the single combination of ignition timings.

20. A system according to claim 19, wherein said first sensing means comprises a sensor for detection of the engine speed and a sensor for detecting the intake air amount or the intake air pressure.

21. A system according to claim 19, wherein said second sensing means comprises a first counting means for counting the number of ignition signals and a second counter for starting to count of clock pulses after the predetermined number of ignition signals is counted and for ending the count of clock pulses after a predetermined number of the ignition signals is counted.

22. A system according to claim 19, wherein the number of combinations of ignition timings in (ii) is equal to the number of the engine cylinders plus 1 and wherein means for the calculation of the new combination of ignition timings $\theta_{new}$ in (vi) comprises: means for calculating, for each engine cylinder, an average ignition timing value $\bar{\theta}$ in the group of the combinations of ignition timings in (ii) and means for calculating said new combination of the ignition timings $\theta_{new}$ by the predetermined formula, which corresponds to the following equation.

$$\theta_{new} = \bar{\theta} - \alpha(\theta_{min} - \bar{\theta}).$$

where: $\alpha$ is constant.

23. A system according to claim 19, further comprising means for judging whether or not the calculated parameter in (vi) corresponds to the parameter value obtained at the output characteristic most distant from the optimum output characteristic in (v), and wherein the means for calculation in (vi) effected at step (x) comprises means for maintaining the formula when the judgement is "No", means for modifying the formula when the judgement is "Yes", and means for calculating the new combination of ignition timings $\theta_{new}$ by using the maintained or the modified formula.

24. A system according to claim 23, wherein the number of the combinations of ignition timings in (ii) is equal to the number of the engine cylinders plus 1; wherein means for calculation of the new combination of ignition timings $\theta_{new}$ comprises means for calculating, for each cylinder an average ignition timing value $\theta$ in the group of combinations of ignition timings and means for calculating said new combination of ignition timings $\theta_{new}$ by the formula, which corresponds to $$\theta_{new} = \theta - \alpha(\theta_{min} - \theta);$$

and wherein means for modifying the formula comprises means for subtracting a fixed value $\Delta\alpha$ from $\alpha$ which is used in the preceding period.

25. A system according to claim 19, wherein it, further comprises means for selecting at least one combination of ignition timings from said group of combinations of ignition timings, means for repeatedly operating the engine once more for the predetermined period at the selected combination of ignition timings, means for detecting the output characteristic parameter value at said repeated period, and means for calculating the diferrence between the detected parameter value in said repeated operation and the detected parameter value at the selected combination of ignition timings in the preceding period, means for determination in (v) comprises means for correcting the data of the detected parameters by use of the difference and means for comparing the corrected parameters to obtain the combination of ignition timings producing the operating output characteristic most distant from the optimum output characteristic.

26. A system according to claim 25, wherein said means for correcting comprises means for determining the straight line connecting the location producing the parameter value obtained at the combination selected in the preceding step and the location producing the parameter value obtained at the combination selected in the subsequent repeated step, means for calculating the distances from the line to the locations producing the parameter values at the combinations of ignition timings other than the selected combination of ignition timings, and means for determining the minimum value of said distances, the ignition timings producing the minimum value being used as the combination of ignition timings $\theta_{min}$.

27. A system according to claim 25, wherein the combination of ignition timings selected from the group of combinations of ignition timings is the first combination.

28. A system according to claim 25, wherein the operation is repeated after the operation at the combination in (iii).

* * * * *